March 27, 1934. C. A. PEARSON 1,952,605
SELF LOCKING PIPE CLAMP FOR FIELD WELDING
Filed Sept. 14, 1932
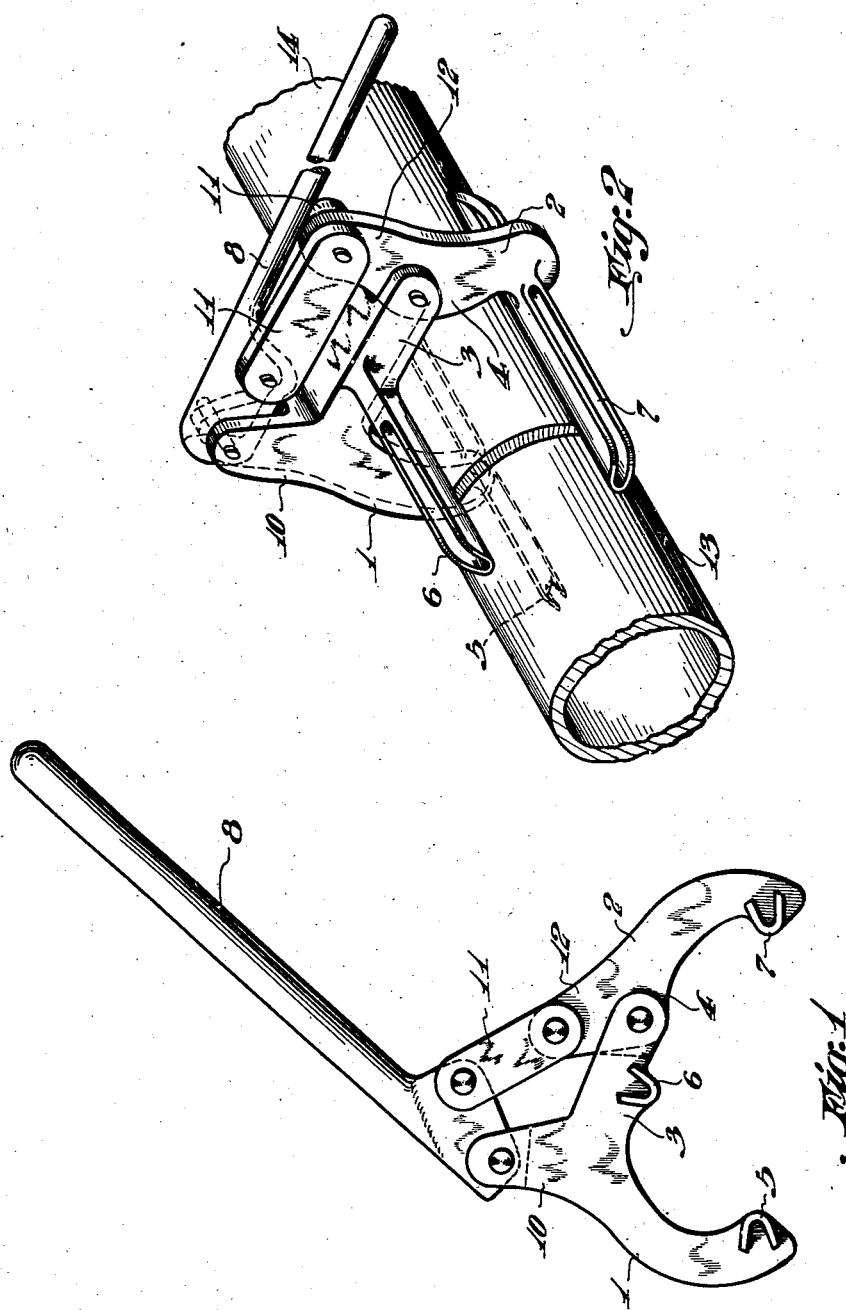
WITNESSES.
E. J. Maloney.
J. P. Langley
INVENTOR.
Carl A. Pearson
BY
Brown, Critchlow & Flick
ATTORNEYS.

Patented Mar. 27, 1934

1,952,605

UNITED STATES PATENT OFFICE 1,952,605

SELF-LOCKING PIPE CLAMP FOR FIELD WELDING

Carl A. Pearson, Oil City, Pa., assignor to National Transit Pump & Machine Company, Oil City, Pa., a corporation of Pennsylvania Application September 14, 1932, Serial No. 633,113

7 Claims. (Cl. 113—102)

My invention relates to pipe clamps and particularly to clamps that are employed in connection with the field welding of pipes of pipe lines for oil, gas or water.

In the operation of welding pipes and particularly by means of butt welds, it is very essential that the pipes be in axial alignment in order that the ends may be in proper position for a weld of uniform width and depth. Such precautions are necessary to prevent imperfect welds such as may be caused by misalignment of the pipe or variations in the distance between adjacent surfaces to be welded.

In accordance with the present invention, I provide a pipe clamp consisting of a unitary mechanism having relatively movable parts that may be actuated to open position to receive pipes therein and which may be locked in their closed or clamping positions. The actuating means for the clamping members positively open the latter and also lock them in their clamping positions.

The details of my invention will be described in connection with the accompanying drawing, in which, Fig. 1 is a view in side elevation with the clamping members in their extended or open positions; Fig. 2 is a perspective view of the pipe clamp in engagement with the end portions of two aligned pipes.

Referring to the drawing, a pipe clamp constructed in accordance with my invention comprises two clamping members 1 and 2 that are pivotally connected at intermediate portions by means of a bar 3 that is integral with the member 1 and is pivotally connected to an enlarged portion 4 of the member 2. The members 1 and 2 are oppositely curved below their pivotal connection in order that they may enclose opposite sides of pipes that may be therebetween.

The curved member 1 is provided with two transversely extending members 5 and 6 that are of angular cross-section for engaging the sides of aligned pipes. The member 2 is provided with a similar transverse member 7, the members 5, 6 and 7 extending along lines that are equally angularly spaced from each other when the clamp is in operating position.

The upper ends of the clamping members 1 and 2 are connected by a lever 8 that is pivotally connected to an extension 10 integral with the clamping member 1 and which is connected at an intermediate portion by means of two links 11 to an extension 12 integral with the clamping member 2.

When the lever 8 is in its uppermost position as shown in Fig. 1 the upper ends of the clamping members 1 and 2 are drawn together by the lever 8 and the links 11 to extend the curved portions of the clamping members 1 and 2 to their fully open positions. The various members occupy these respective positions when it is desired to place the clamp over the ends of aligned pipes for field welding.

In the application of my improved clamp, sections of pipes are placed along the side of a ditch in which they are to be laid and the sections to be welded are usually mounted upon suitable supports or "horses" in order that the welding operation may occur at a convenient distance above the ground.

The pipes to be welded are placed end-to-end, closely adjacent and in substantial alignment. The clamp, in its open position, as illustrated in Fig. 1, is then placed over the pipes to enclose them at their ends in such manner that the beveled edges thereof are exposed. The lever 8 is then actuated downwardly to cause the links 11 to separate the projections 10 and 12 of the clamping members 1 and 2 to thereby cause the latter to tightly grip the pipes 13 and 14 at their adjacent ends by means of the transverse members 5, 6 and 7. The lever 8 and the links 11 constitute a toggle which is then in its locked position.

The ends of the pipes and the clamp then occupy the positions shown in Fig. 2. Since the members 5, 6 and 7 extend along the sides of the pipes and the members 5 and 7 are less than 180° from each other, the pipes are tightly held in axial alignment and the edges of the ends thereof are in accurate position for welding. Also if the pipes have been somewhat deformed from a circular cross-section the clamp will operate to correct the shape of the pipe for welding purposes.

While the pipes are held in this position by the clamp, the abutting or slightly spaced edges are temporarily welded or "tack" welded at several points around the circumference of the joint in order to hold them securely in position for the permanent weld after the clamp has been removed. The welding seam is then completed, the pipes being rolled on the horses as may be necessary to expose the entire circumference of the joint at the ends of the pipes, and the operation is thereby completed.

My improved clamp is also adapted for use in aligning pipes that may not be suspended on frames for elevating but which may lie upon the ground or upon relatively flat supporting means. It will be noted that the clamp when in its open position may be placed over supported pipes and that the lower ends of the clamping members will operate to clamp the pipes thus supported.

Accordingly the clamp of the present application may be used to align the ends of sections of welded pipe in a ditch in which they have been laid without the necessity of excavating under the ends of the pipes for the complete length of the transverse members 5, 6 and 7. Such excavation need only be of sufficient length to permit the welding of the adjacent ends of the pipes.

My improved clamp possesses the advantage that it is in the form of a unitary mechanism and that it is not necessary to connect or disconnect the operating mechanism in placing the clamp in operative position as is necessary with many of the prior art devices. The pivotal connections of the clamping members are adjacent the actuating mechanism and all of the clamp may be placed in position and operated entirely from the upper and therefore easily accessible portions of the clamp.

The clamp members are positively actuated to their open and their closed or clamping positions and they are positively locked in clamping position by means of the toggle mechanism. The latter feature is of particular advantage and is a distinct improvement over certain prior art devices in which it has been necessary for the operator to hold the actuating lever in clamping position until the welding operation has proceeded to a point at which the clamp might be released.

The foregoing and other advantages are obvious to those skilled in the art of welding pipes and the manipulation of clamps therefor.

I claim:

1. A pipe clamp comprising two oppositely curved members hingedly connected at adjacent ends of the curved portions thereof, each of said members being provided with means comprising angularly spaced elements for engaging the sides of two aligned pipes whereby adjacent ends of said pipes may be welded at various portions of their circumferences between said elements, and means connected to said members adjacent their hinge connections for actuating said members into and out of pipe clamping positions.

2. A pipe clamp comprising two oppositely curved members hingedly connected at adjacent ends of the curved portions thereof, each of said members being provided with means for engaging the sides of two aligned pipes at spaced intervals while providing access to the ends of said pipes on opposite sides of the engaging means, and means connected to said members adjacent their hinge connections for actuating said members into and out of pipe clamping positions and for locking said members in their pipe clamping positions.

3. A pipe clamp comprising two oppositely curved members hingedly connected at adjacent ends of the curved portions thereof, said members being provided with means comprising at least three transverse elements for engaging the sides of two aligned pipes at angularly spaced intervals, and a lever connected to portions of said members extending beyond their hinge connection for actuating said members to their respective open and clamping positions.

4. A pipe clamp comprising two oppositely curved members hingedly connected at adjacent ends of the curved portions thereof, said members being provided with means comprising a series of transverse elements for engaging the sides of two aligned pipes at spaced intervals extending for more than half of the circumference of the pipes, and each of said members having portions projecting beyond their hinge connection, and a lever pivotally connected to one of the projecting portions and having a toggle connection to the other projecting portion.

5. A pipe clamp comprising two oppositely curved members that are pivotally connected at intermediate portions thereof, one of said members being provided with at least two and the other member being provided with at least one transversely extending members that are angularly spaced and adapted to engage the sides of two aligned pipes and a lever and a toggle link for connecting said curved member at adjacent ends thereof for positively actuating the curved members into their respective open and clamping positions and locking them in their clamping positions.

6. A pipe clamp comprising two members that are pivotally connected at an intermediate portion, the members being oppositely curved on one side of their pivotal connection and provided with means on the curved portions for engaging aligned pipes along angularly spaced lines on the sides thereof while providing access to the ends of said pipes between said lines and on opposite sides thereof, and means for actuating the ends of the members on the other side of the pivotal connection towards or away from each other to respectively open the curved portions to receive pipes therein and close the latter portions to tightly clamp pipes therebetween.

7. A pipe clamp comprising two members that are pivotally connected at intermediate portions thereof, said members being provided with transversely extending angularly spaced elements adapted to engage the sides of two aligned pipes, and means connected to said members beyond their pivotal connection for actuating them into and out of position for causing said elements to clamp said pipes, whereby said pipes may be clamped from above while supported on a level surface and their adjacent ends may be welded between said elements at various portions of the circumferences of said pipes.

CARL A. PEARSON.